(12) United States Patent
Keller et al.

(10) Patent No.: US 10,251,097 B2
(45) Date of Patent: Apr. 2, 2019

(54) TECHNIQUE FOR APPLYING POLICY AND CHARGING RULES TO BEARERS

(71) Applicant: Telefonaktiebolaget LM Ericsson (publ), Stockholm (SE)

(72) Inventors: Ralf Keller, Würselen (SE); Patrik Dannebro, Hisings Kärra (SE); Anders Ryde, Saltsjöbaden (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 107 days.

(21) Appl. No.: 15/320,069

(22) PCT Filed: Jul. 29, 2015

(86) PCT No.: PCT/EP2015/067436
§ 371 (c)(1),
(2) Date: Dec. 19, 2016

(87) PCT Pub. No.: WO2016/016338
PCT Pub. Date: Feb. 4, 2016

(65) Prior Publication Data
US 2018/0184336 A1 Jun. 28, 2018

Related U.S. Application Data

(60) Provisional application No. 62/030,288, filed on Jul. 29, 2014.

(51) Int. Cl.
*H04W 36/00* (2009.01)
*H04W 76/19* (2018.01)
(Continued)

(52) U.S. Cl.
CPC ....... *H04W 36/0011* (2013.01); *H04M 15/66* (2013.01); *H04W 4/24* (2013.01);
(Continued)

(58) Field of Classification Search
CPC ......... H04W 36/0011; H04W 36/0022; H04W 36/08; H04L 12/1407
See application file for complete search history.

(56) References Cited

U.S. PATENT DOCUMENTS

| 2012/0026979 | A1 | 2/2012 | Rommer et al. |
| 2013/0016658 | A1* | 1/2013 | Lovsen ................ H04W 76/19 370/328 |
| 2014/0204950 | A1 | 7/2014 | Willars et al. |

FOREIGN PATENT DOCUMENTS

| EP | 2836036 A1 | 11/2015 |
| WO | 2013151125 A1 | 10/2013 |

OTHER PUBLICATIONS

GSM Association; "Rich Communication Suite 5.2 Advanced Communications Services and Client Specification Version 5"; Official Document RCC.07—Rich Communication Suite 5.2 Advanced Communications Services and Client Specification; May 7, 2014; pp. 1-550.

(Continued)

*Primary Examiner* — Kiet Tang
(74) *Attorney, Agent, or Firm* — Coats & Bennett, PLLC (57) ABSTRACT

The present disclosure generally relates to aspects of applying policy and charging rules to bearers in a communication network. The policy and charging rules are provided for application to at least a dedicated bearer. The technique presented herein may be implemented in connection with a mobile terminal moving between an access point of a first type supporting default and dedicated bearers and an access point of a second type supporting default and not supporting dedicated bearers. A method embodiment of the present disclosure removes an established dedicated bearer and temporarily suspends application of the rules to the dedicated bearer upon a move from an access point of the first type to an access point of the second type. A network (Continued)

endpoint of an ongoing session kept agnostic of the removal of the dedicated bearer. Upon a move from the access point of the second type to an access point of the first type, the dedicated bearer is re-established and the rules are re-applied to the re-established dedicated bearer.

17 Claims, 9 Drawing Sheets

(51) Int. Cl.
   *H04W 4/24* (2018.01)
   *H04W 36/08* (2009.01)
   *H04M 15/00* (2006.01)
   *H04W 36/14* (2009.01)
   *H04L 12/14* (2006.01)

(52) U.S. Cl.
   CPC ....... *H04W 36/0022* (2013.01); *H04W 36/08* (2013.01); *H04L 12/1407* (2013.01); *H04W 36/0027* (2013.01); *H04W 36/14* (2013.01)

(56) References Cited

OTHER PUBLICATIONS

GSM Association; "IMS Profile for Voice and SMS Version 7.0"; Official Document IR.92; Mar. 3, 2013; pp. 1-32.
GSM Association; "IMS Profile for Conversational Video Service Version 5.0"; Official Document IR.94; Mar. 4, 2013; pp. 1-16.
GSM Association; "IMS Roaming and Interworking guidelines Version 12.0"; Official Document IR.65; Feb. 15, 2013; pp. 1-38.
Third Generation Partnership Project; "Technical Specification Group Services and System Aspects; General Packet Radio Service (GPRS) enhancements for Evolved Universal Terrestrial Radio Access Network (E-UTRAN) access (Release 12)"; 3GPP TS 23.401 V12.5.0; Jun. 2014; pp. 1-305; Sophia Antipolis, Valbonne, France.
Third Generation Partnership Project; "Technical Specification Group Services and System Aspects; Policy and charging control architecture (Release 13)"; 3GPP TS 23.203 V13.0.1; Jun. 2014; pp. 1-220, Sophia Antipolis, Valbonne, France.
Third Generation Partnership Project; "Technical Specification Group Services and System Aspects; Arvhitecture enhancements for non-3GPP accesses (Release 12)"; 3GPP TS 23.402 V12.5.0; Jun. 2014; pp. 1-291; Sophia Antipolis, Valbonne, France.

* cited by examiner

TECHNIQUE FOR APPLYING POLICY AND CHARGING RULES TO BEARERS

TECHNICAL FIELD

The present disclosure relates to methods and network nodes for application of policy and charging rules to bearers.

BACKGROUND

In today's mobile networks, mobile terminals have the possibility to use access points of different technologies, like 3G/4G ($3^{rd}$ resp. $4^{th}$ generation networks), or LTE resp. WCDMA/UMTS as defined by 3GPP/ETSI standards, WiFi as defined by IEEE 802.11, and potentially other access points. Generally spoken, a mobile terminal may use access points having different capabilities, for example with respect to support of Quality of Service (QoS) behaviour, type and number of bearers etc.

Nevertheless, it is desired that services can be used as seamlessly as possible even when a mobile terminal changes its access point during usage of a certain service or during an active session.

One specific example is the usage of VoLTE (Voice over LTE) as described in GSMA PRDs (Permanent Reference Documents) IR.92 and IR.94, and employing the VoLTE roaming architecture as described in GSMA PRD IR.65. VoLTE is based on the IMS (IP Multimedia Subsystem) architecture and thus uses corresponding network nodes and their capabilities, which are at the same time used by Rich Communication Services (RCS) as described in GSMA PRD RCC.07.

Figure 1:
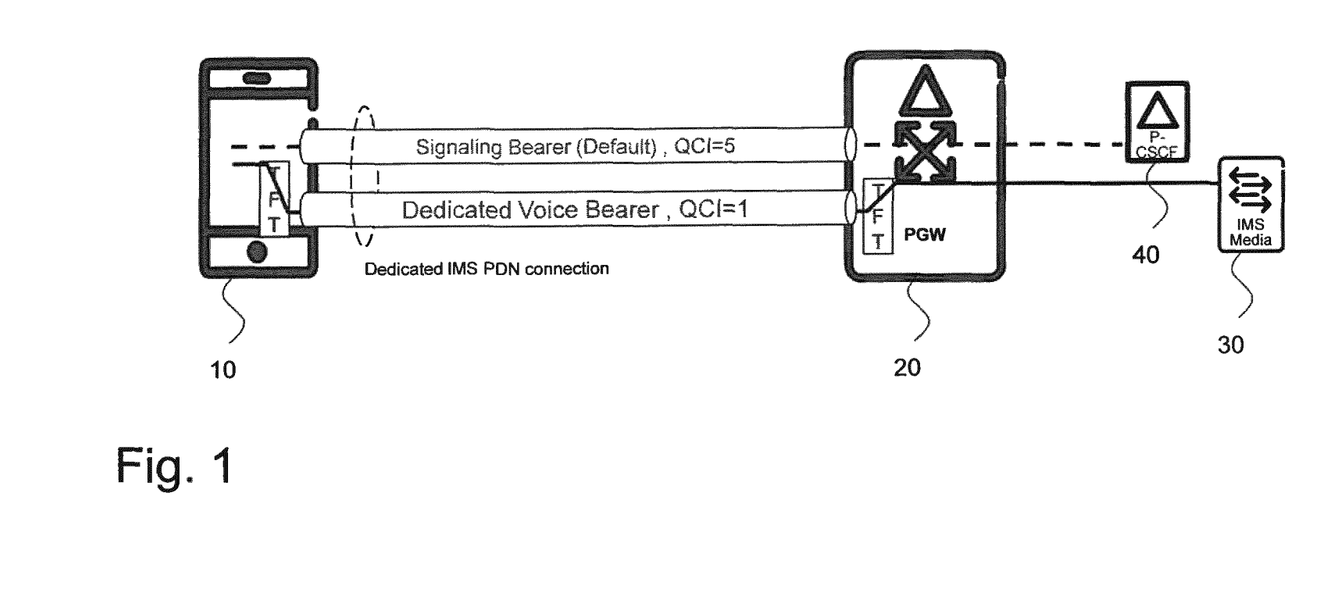
FIG. 1 shows a PDN connection between a mobile terminal and a PDN GW that can be implemented in an embodiment of the present disclosure.

FIG. 1 shows an example of a Packet Data Network (PDN) connection between a mobile terminal 10 and a PDN Gateway (PGW) 20 in a 4G network. Such PDN connection is a tunnel between the mobile terminal 10 and the PGW 20, i.e., the used access point (e.g., radio technology) is transparent for this connection. It consists of a default bearer, here the signaling bearer with a Quality of Service Class Identifier of QCI=5, and potentially other Evolved Packet System (EPS) bearers like the shown Dedicated Voice Bearer with QCI=1. Generally, an EPS bearer is a virtual connectivity between the mobile terminal 10 and the PGW 20. It can be for general usage (e.g. as a default bearer or for dedicated signaling and/or media usage). Dedicated bearers can be dynamically established by the communication network and may support different characteristics like QoS (signaling, voice, video, best effort etc.) and use so-called Traffic Flow Templates (TFT) as generally known in the art. In the IMS PDN connection as defined in GSMA PRD IR.92 (VoLTE), the signaling bearer is the default bearer, and dynamically established bearers may be used for SIP-controlled media like voice and/or video. Usually, the mobile terminal 10 has assigned one IP address per PDN connection, and the PDN connection is not changed when the access point (e.g., in terms of Radio Access Technology (RAT)) is changed.

In this scenario, if the IMS Access Point Name (APN) as defined by GSMA is used for both VoLTE and RCS, and a mobile terminal may change its network access between 3G and 4G networks, the following and other problems may occur.

Many currently deployed 3G/WCDMA networks do not support secondary Packet Data Protocol (PDP) contexts and thus cannot provide Network-Initiated Dedicated Bearers (NIDBs). Further, they may have limited support for parallel Packet Switched (PS) Radio Access Bearers (RABs). This may particularly occur in case the mobile terminal is roaming to another operator's network. As a consequence, in many cases all traffic on the IMS APN on 3G/WCDMA must be on a single bearer, namely the default bearer. Note that if a 3G network supports PRD IR.58 (VoHSPA), then there must be also secondary PDP context support and in this case NIDB can be handed over from 4G to 3G and vice versa. However, at present there are no networks supporting PRD IR.58.

At the same time, 4G/LTE access supports a default bearer (used as signaling bearer) and dynamically established dedicated media bearers. Thus, if a mobile terminal experiences a handover to or from 3G/WCDMA, there is the risk that media may be dropped (in the case of handover from 4G/LTE to 3G/WCDMA) or that the default bearer at QCI=5 will be overloaded (in the case of handover from 3G/WCDMA to 4G/LTE).

Accordingly, there is a need for a solution to mitigate these and other problems.

SUMMARY

According to one aspect, a method of enabling session or service continuity for a mobile terminal moving between an access point of a first type supporting default and dedicated bearers to an access point of a second type supporting default and not supporting dedicated bearers is presented, wherein policy and charging rules are provided for application to at least a dedicated bearer. The method comprises, upon a move from an access point of the first type to an access point of the second type, removing an established dedicated bearer and temporarily suspending application of the rules to the dedicated bearer, wherein an endpoint of the session or service is kept agnostic of the removal of the dedicated bearer. The method further comprises, upon a move from the access point of the second type to an access point of the first type, re-establishing the dedicated bearer and re-applying the rules to the re-established dedicated bearer.

In one variant, the endpoint of the session or service is an IMS or IMS application. Other types of network endpoints could likewise be supported.

According to a second aspect, a method of establishing a dedicated bearer for a mobile terminal moving to an access point of a first type supporting default and dedicated bearers from an access point of a second type supporting default and not supporting dedicated bearers is presented. The method comprises receiving policy and charging rules for application to at least a dedicated bearer. The method further comprises, upon a move from an access point of the second type to an access point of the first type, establishing the dedicated bearer and applying the rules to the established bearer.

In the second aspect, the rules for the dedicated bearer may be received while the mobile terminal is still attached to the access point of the second type not supporting dedicated bearers. The received rules may at least temporarily be stored until they can be applied to the newly established dedicated bearer.

According to a still further aspect, there is provided a method for application of policy and charging, PCC, rules in a network (e.g., by a network node). Said rules are set for attachment of a mobile terminal to the network (e.g., the network node) via an access point of a first type, and are at least partly not applied, partly applied or applied differently if the mobile terminal is attached to the network node via an access point of a second type.

There is further provided a method for application of policy and charging, PCC, rules by a network node having received said rules from a policy controller, wherein said rules are at least partly not applied if a mobile terminal is attached to the network (e.g., the node) via an access point of a second type which does not support network initiated dedicated bearers and/or secondary PDP contexts.

In all cases, the access point of the first type may be an access point which supports NIDBs and/or secondary PDP contexts, particularly an access point being part of a 4G/LTE network, and the access point of the second type may be an access point which does not support NIDBs and/or secondary PDP contexts, particularly an access point being part of a 3G/WCDMA or WiFi network.

Under the term that rules are partly not applied several possibilities can be understood. For example, it is conceivable that certain rules, (e.g., a subset of the currently active rules) are disregarded, or are temporarily replaced by different rules, or are applied in a different way, for example by applying them to a situation for which they are not intended, like for a different bearer (e.g., for the default bearer instead of a dedicated bearer such as an NIDB).

The rules may be bearer handling rules. The rules may be applied at least partly to the default bearer of the access point of the second type (e.g., as far as they are applicable to that default bearer). According to a first variant, a non-applicable part of the rules is overwritten with a value applicable to the default bearer of the access point of the second type. According to a second variant, a non-applicable part of the rules is omitted from being applied to the default bearer of the access point of the second type. The non-applicable part may be related to a QoS parameter, such as one of a Guaranteed Bit Rate (GBR), a Minimum Bit Rate (MBR), a Quality of Service Class Indentifier (QCI) and an Allocation and Retention Priority (ARP).

As such, a subset of the rules may temporarily be disabled or replaced by a different subset during attachment of the mobile terminal via the access point of the second type. The rules that are at least partly not applied (or applied at least partly to a different bearer) may in one variant relate to capabilities of an RAT of the access point of the second type and/or in a second variant to characteristics of one or more bearers established or to be established for communication between the network and the mobile terminal. The rules may partly not be applied, or may be applied at least partly to a different bearer, upon a change of the mobile terminal from an access point of the first type to an access point of the second type.

The rules may be marked. For example, the rules may be marked as being not applied or as being suspended from application, or as being applied only partially or differently. Such a marking may in some cases help to re-apply the (same) rules to a newly established or re-established (e.g., dedicated) bearer.

For the case that rules are applied to a different bearer if the mobile terminal is attached to the network via an access point of the second type, the rules may not be applied any more to the different bearer when the mobile terminal changes from an access point of the second type to an access point of the first type. Additionally, or in the alternative, in this case the rules may not be applied any more to the different bearer when a dedicated bearer is established.

The different bearer may be a default bearer. In such a case, the rules that are directed, or intended, to be applied on a dedicated bearer may (at least partially) be applied on the default bearer. The dedicated bearer may generally be an NIDB.

The rules may be applied upon a change of the mobile terminal from an access point of the second type to an access point of the first type. In certain variants, the rules may have been set for application by a network node, and the mobile terminal may be attached to the network node. That network node may generally be a gateway node (e.g., a PGW).

In certain variants, the rules may be received at an arbitrary point in time. As an example, the rules may be received from a policy controller in the network.

Also provided is a computer program product comprising computer program code which, when executed by a processor, causes the processor to perform a method as presented herein. The computer program product may be stored on a computer-readable medium. Also, the computer program product may be provided in the form a data signal downloaded via a communication connection.

There is further provided an arrangement (e.g., a network node, particularly a gateway node, more particularly aPGW node) capable of performing one or all of the methods and method aspects disclosed herein.

BRIEF DESCRIPTION OF THE DRAWINGS

Further characteristics and advantages of the present disclsore will become apparent from the detailed description of particular but not exclusive embodiments, illustrated by way of non-limiting examples in the accompanying drawings, wherein.

DETAILED DESCRIPTION

In the following description, for purposes of explanation and not limitation, specific details are set forth, such as specific network environments, in order to provide a thorough understanding of the present disclosure. It will be apparent to one skilled in the art that the present disclosure may be practiced in other embodiments that depart from these specific details. Moreover, while the following embodiments are exemplarily described with reference to certain RATs and certain wireless communication standards, it is readily apparent that the present disclosure may also be implemented using other RATs and other wireless communication standards, in particular the standards described in the Background section of this application.

Further, those skilled in the art will appreciate that the services, functions and steps explained herein may be implemented using software functioning in conjunction with a programmed processor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in the context of methods and devices, the present disclosure may also be embodied in a computer program product as well as in a system comprising a computer processor and a memory coupled to the processor, wherein the memory is encoded with one or more programs that may cause the processor to perform the services, functions, and steps disclosed herein. It will be appreciated that the present disclosure may also be embodied in a distributed manner using, for example, cloud computing resources.

Within the context of the present application, the term "communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of nodes or entities of a communication network are radio access network (such as 2G/GSM, 3G/WCDMA, CDMA, 4G/LTE, WLAN, Wi-Fi), mobile backhaul network, or core network such as IMS, CS Core, PS Core.

A "mobile terminal" may be any device intended for accessing services via an access point (e.g., within an access network) and configured to communicate over the access point. For instance, the mobile terminal may be, but is not limited to: a mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The mobile terminal may be a portable, pocket-storable, hand-held, computer-comprised, or vehicle-mounted mobile device, enabled to communicate voice and/or data, via a wireless connection. A mobile terminal may be equipped with a Subscriber Identity Module (SIM) resp. Universal Integrated Circuit Card (UICC) comprising unique identities such as the International Mobile Subscriber Identity (IMSI) and/or Temporary Mobile Subscriber Identity (TMSI) associated with a subscriber using the mobile terminal. The presence of a SIM within a mobile terminal customizes the mobile terminal uniquely with a subscription of the subscriber.

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may for example be Mobility Management Entity (MME), Serving Gateway Support Node (SGSN), Proxy Call State Control Function (P-CSCF) or Serving-CSCF (S-CSCF).

The term "packet gateway" refers to a media plane related node primarily handling the forwarding of packets. So a PGW may be an embodiment of such a packet gateway, which is a 3GPP standardized part of the Evolved Packet Core (EPC). The PGW may communicate via an interface called Gx with a PCRF for receiving Policy and Charging Control (PCC) bearer handling rules.

Within the context of the present application, the term "policy controller" refers to a control server handling primarily policy and charging rules related functions. So a Policy and Charging Rules Function (PCRF) may be an embodiment of such a policy controller, which is a 3GPP standardized part of the EPC. The PCRF communicates via an interface called Rx with an application function. This application function may be a control server for handling session control in IMS, such as the P-CSCF. The PCRF communicates via an interface called Gx with a PGW for applying PCC bearer handling rules.

The term Access Point Name (APN) refers to the name of a gateway between a mobile network and another (computer) network, for example the public Internet. In the context of this application, an APN may be embodied or comprised by a packet gateway (e.g., a PGW). A packet gatewaymay comprise or embody more than one APN. Further, a packet gatewaymay be connected to one or more radio access networks which each may comprise an access point of a certain type, particularly of a certain RAT, for example an access point of a 3G, 4G, or WiFi network.

In the following some scenarios are presented in which the methods and network nodes presented herein may be applied. The general scenario has already been described above with respect to FIG. 1.

In some scenarios, for example VoLTE and RCS may be used on an IMS APN 30 using 4G/LTE and 3G/WCDMA accesses (see FIG. 1). As mentioned above, in such a case NIDB and/or secondary PDP context may not be supported on 3G/WCDMA, but more than one PS bearer may be supported on 3G/WCDMA. Further, downloadable RCS clients may not use the IMS APN, and HTTP/IMAP/XCAP may not be on the IMS APN. Domain Name Services (DNS) may be on the default bearer of the APN for which the response is needed.

Figure 2:
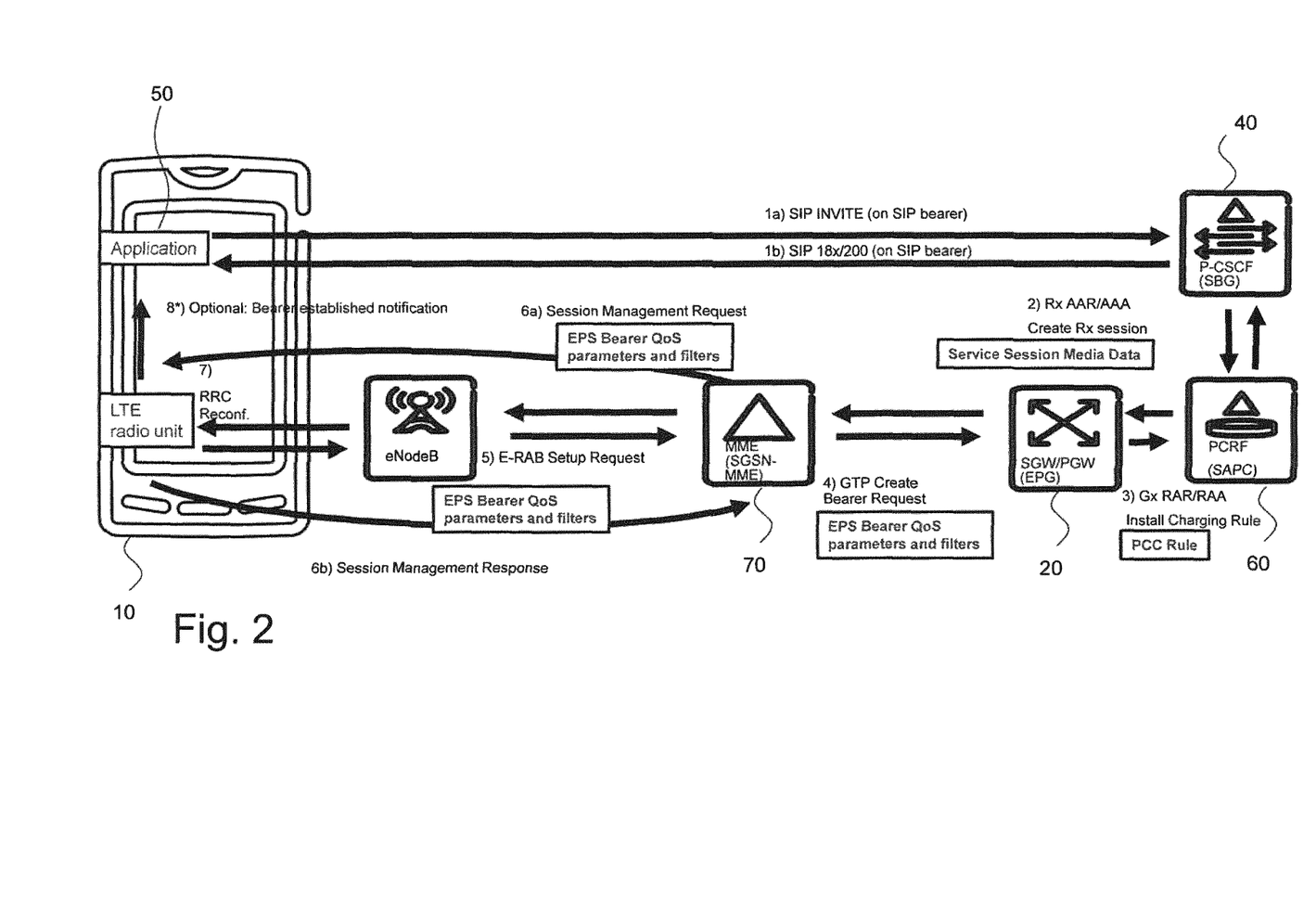
FIG. 2 depicts the process of network initiated bearer establishment that can be implemented in an embodiment of the present disclosure.

Network initiated dedicated bearer establishment, as generally known, is illustrated in FIG. 2 and may also be implemented in the present embodiments in the manner shown in FIG. 2 (in particular with regard to rule installment and handling). In FIG. 2, dedicated Evolved Packet System (EPS) bearer setup for media may be triggered by a P-CSCF (see also reference numeral 40 in FIG. 1). An (e.g., IMS) application 50 on the mobile terminal 10 may or may not be aware of EPS bearer establishment.

Several mobility scenarios will be discussed in the following. Therein, the term "3G" is used for a 3G network without support for NIDB/secondary PDP contexts, but it is also valid for other RATs without support for NIDB/secondary PDP contexts (e.g., EPC-integrated WiFi without supporting dedicated bearer between PDN-GW and TWAN/ePDG).

When access is changed from 4G to 3G for an ongoing RCS IP video call, NIDB for audio and video will be lost, resulting in a loss of the call if media is not possible on the default bearer, and must be re-established. In such a case the IMS application could use audio and video media on the default bearer and not terminate the session when it is informed about loss of the bearer; as an alternative, IMS may not be informed about the loss of the bearer, resulting in routing of traffic to the default bearer without IMS knowledge. Both approaches would, however, cause problems when moving back from 3G to 4G later on.

In a messaging session based on Message Session Relay Protocol (MSRP), an NIDB for MSRP would be lost. Again, the IMS application could allow using MSRP on the default bearer and not terminate the session when it is informed about loss of the bearer; as an alternative, IMS may not be informed about the loss of the bearer, resulting in routing of traffic to the default bearer without IMS knowledge. Both would, however, cause problems when moving back from 3G to 4G later on.

Similar issues arise upon initial attach in 3G. For an RCS IP video call, NIDB for audio and video cannot be established, such that the call cannot be established if media is not possible on the default bearer. In such a case the IMS application, which may be running on the mobile terminal, could allow audio and video media on the default bearer and not terminate the session when it is informed about failure to set up the bearer or not informed about the setup of the bearer; as an alternative, IMS may not be informed about the failure to set up the bearer, resulting in routing of traffic to the default bearer without IMS knowledge. Both approaches would, however, cause problems when moving to 4G. Also for a messaging session based on MSRP, an NIDB for MSRP cannot be established. On the other hand, the IMS application could allow to use MSRP on the default bearer and not terminate the session when it is informed about failure to set up the bearer; as an alternative, IMS may not be informed about the failure to set up the bearer, resulting in routing of traffic to the default bearer without IMS knowledge. Again, both approaches would cause problems when moving to 4G later on.

When the mobile terminal moves from 3G to 4G, an ongoing RCS IP video call or an ongoing MSRP session will be mapped on the default bearer in 4G. Thus, dedicated bearers could be or would need to be established for audio and video resp. MSRP when moving to 4G. This can be achieved either by IMS requesting dedicated resources to be established or handled by the PDN-GW if IMS has not been informed that traffic has been routed on the default bearer for the RAT that does not support NIDB/secondary PDP context.

As described above, the present disclosure provides methods and network nodes for application of policy and charging (e.g., PCC) rules. The general idea of some embodiments is to temporarily disable or suspend application of rules if a mobile terminal is attached to a network node, for example a PDN GW, via an access point of a certain type, particularly of a type which does not support NIDB and/or secondary PDP context. In this case, for example existing rules may be applied to a situation for which they are not intended, (e.g., apply rules intended to be used for a dedicated bearer on the default bearer). Such application of rules may, for example, involve application of packet filters or the like.

This procedure may have the effect of hiding or disregarding the capabilities of a RAT, for a specific APN, regarding NIDB and/or secondary PDP context. Thereby, services would be allowed to "survive" on the default bearer for that RAT when moving from an access point of a first type (e.g., 4G) to an access point of a second type (e.g., 3G) or when being established in the second type (e.g., 3G), until moving to the first type (e.g., 4G), where dedicated bearers are (re-)established. IMS will not tear down the session, since it is not informed of the removal of the dedicated resources.

Thus, even in case that secondary PDP context/NIDB are not supported on 3G/2G (or other accesses), the IMS APN can be used, for example, for RCS services requiring MSRP and/or RTP on the default bearer in 3G/2G (or other accesses). In addition it is ensured that NIDBs are established when moving to 4G such that the MSRP and Realtime Transport Protocol (RTP) traffic is not on the QCI=5 bearer when on 4G (see FIG. 1).

A Service Aware Policy Controller (SAPC, see reference numeral 60 in FIG. 2) and/or IMS are/is kept blind of the situation of removed dedicated bearer and is prevented to tear down the IMS session for a RAT that (by intent) does not support NIDB/secondary PDP context, in contrary to what is wanted in 4G.

This is based on provision resp. application of a corresponding (e.g., PCC) rules.

Figure 3:
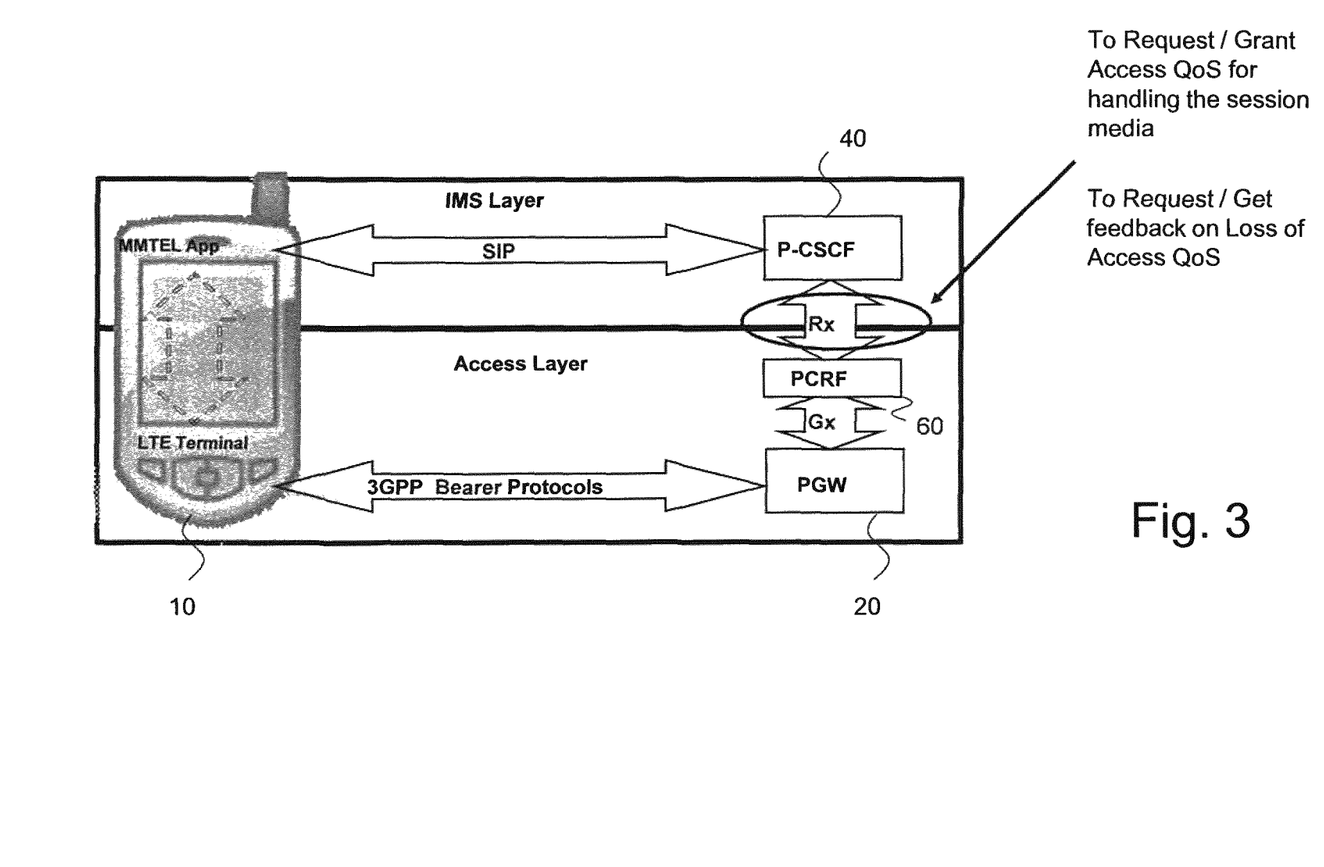
FIG. 3 depicts an architecture for provisioning of PCC rules that can be implemented in an embodiment of the present disclosure.

The general architecture (Rx interface in VoLTE as a non-limiting example) for provision of rules, that may also be implemented in connection with the present embodiments, is shown in FIG. 3. A PCRF 60 provides, during session establishment, rules to the PGW 20 via the Gx interface and to the P-CSCF 40 via the Rx interface.

Figure 4:
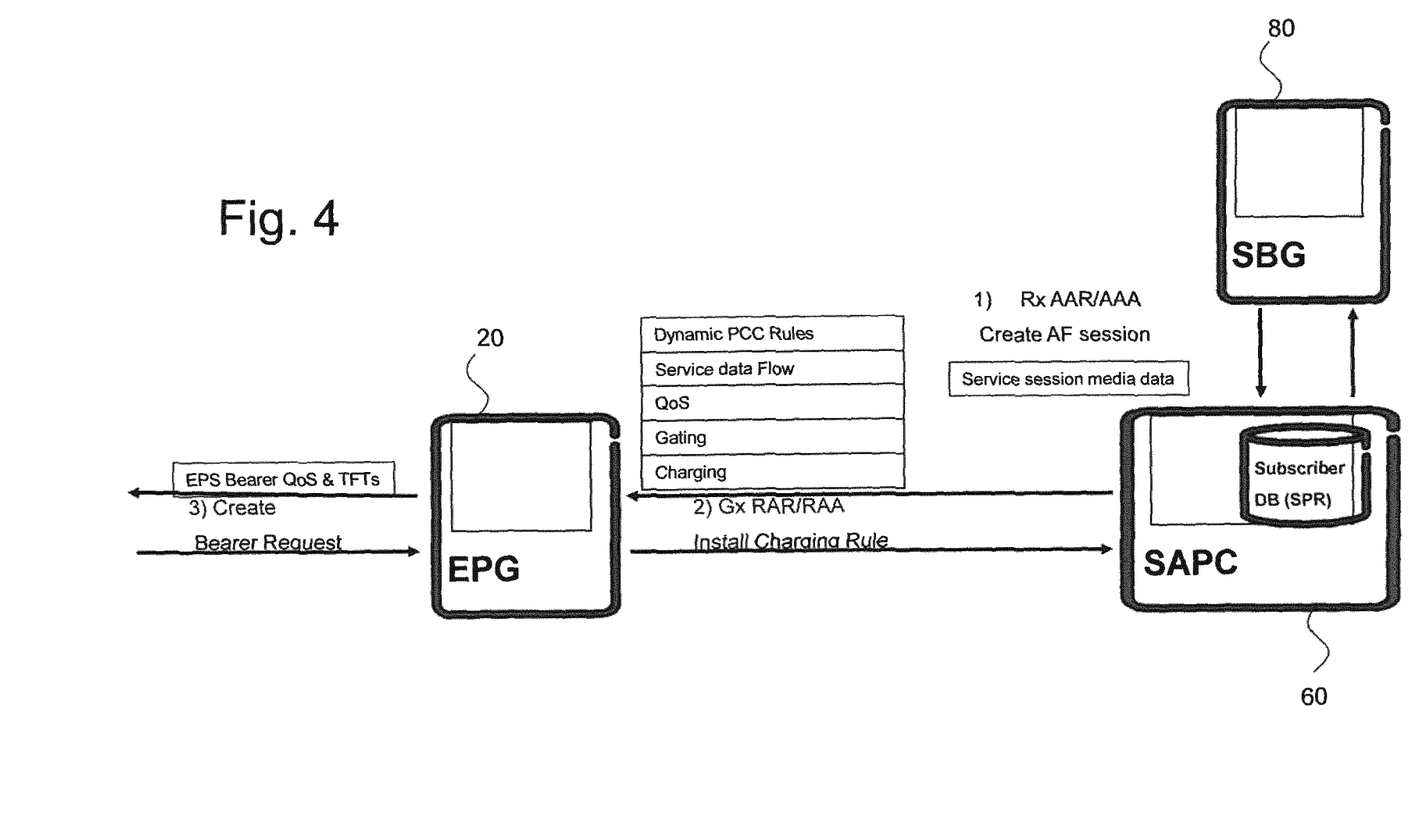
FIG. 4 depicts the process of setting up an Rx session that can be implemented in an embodiment of the present disclosure.

Setup or creation of the Rx session, that may also be implemented in connection with the present embodiments, is depicted and described in FIG. 4. The scenario illustrated in FIG. 4 may in particular be implemented in the present embodiments with respect to the rule installment and rule handling procedures shown therein. FIG. 4 illustrates in particular exemplary dynamic PCC rules and the process of installing a charging rule. The scenario in FIG. 4 partially concretizes signaling aspects already illustrated in FIG. 2.

As illustrated in FIG. 4, Rx session creation is done as part of a Session Initiation Protocol (SIP) session establishment process to request Access QoS. Rx requests without media may not be supported (as there are no plans to support Rx session creation to subscribe to Notifications of Signaling Path Status).

In the scenario of FIG. 4, an Evolved Packet Gateway (EPG), which may be an implementation of the PGW 20 discussed above, sets up a bearer binding (i.e., TFT per bearer). The EPG requests a new bearer if no other bearer exists within a particular QCE/ARP. The SAPC, which may be an implementation of or incorporate the PCRF 60, is configured to derive the PCC rules. Alternatively, or in addition, the SAPC could also decide to modify the default bearer. The SAPC rejects it if the Gx session is not established or the request is not authorized. As illustrated in FIG. 4, the SAPC can be in communication with a so-called Session Boarder Gateway (SBG) 80, which is in charge of session border control.

It is conceivable that at E-UTRAN (4G/LTE) access, a mobile terminal 10 according to E-UTRAN Rel-9 or later indicates to the PDN GW 20 its capability of NIDB for GERAN/UTRAN access. PDN-GW 20 then may derive the Bearer Control Mode (BCM) for GERAN/UTRAN access based on the mobile terminal's 10 indication and operator policy (see section 4.7.6 in TS 23.401). PDN-GW 20 then provides to the mobile terminal 10 the derived BCM for GERAN/UTRAN. The derived BCM is also stored in the PDN GW 20 and the mobile terminal 10, and applied by the mobile terminal 10 upon moving to GERAN or UTRAN access.

When receiving an indication that RAT has changed from a RAT supporting NIDB to a RAT that does not support NIDB and/or secondary PDP context for this mobile terminal 10 (e.g., User Equipment, UE) for the specified APN, and possibly for specified QCI/bearers, then the PDN GW 20 may perform measures to temporarily suppress or exchange according rules as will be described in the following. The information which RAT does not support NIDB and/or secondary PDP context for this mobile terminal 10 may be based on the BCM value stored by the PDN GW 20 or may be provisioned into the PDN GW 20.

Particularly, the PDN GW 20 may move the dynamic PCC rules which were installed on 4G dedicated bearer(s)

(see FIG. 4) before the mobility from the dedicated bearer (see FIG. 1) and install applicable parts of those rules to the 3G default bearer. Examples of non-applicable parts are QCI/ARP (/MBR/GBR) information that needs to be overwritten by the value for the 3G default bearer or omitted. The moved rules may be marked as "temporary moved" so as to remember which rules are associated with dedicated bearers in 4G.

Then, the PDN GW 20 may respond to a Delete PDP Context Request from Gn/Gp SGSN (see, e.g., reference numeral 70 in FIG. 2), or a corresponding request from S4 SGSN, referring to a secondary PDP context that is removed by the SGSN when the mobile terminal is moving from 4G to 3G, but perform no further action towards the PCRF 60. It is noted that it may be necessary that the SGSN 70 removes the existing secondary PDP context if the target SGSN does not support secondary PDP contexts. In case the target SGSN supports secondary PDP contexts, GGSN/PDN-GW 20 can trigger the deletion of the PDP contexts corresponding to the dedicated bearers if GGSN/PDN-GW knows that the mobile terminal 10 (e.g., UE) does not support NIDB for GERAN/UTRAN access based on the stored BCM value. It is further noted that the dynamic PCC rules associated with this secondary PDP context may have already been temporarily moved to the default bearer, or the temporary move may be triggered by the delete PDP context operation, so there may be no remaining dynamic PCC rules associated with the secondary PDP context that can be inactivated.

When performing 4G to 3G handover (PS HO), the mobile terminal 10 shall resume/continue its traffic which was carried by both default and dedicated bearer at 4G access, but now only the remaining default bearer is used.

When receiving from the PCRF 60 new PCC rules, modifications to PCC rules or removal of PCC rules associated with a secondary PDP context, in a RAT that does not support NIDB and/or secondary PDP context, for the specified APN, and possibly for specified QCI/bearers, then the PDN GW 20 may apply the PCC operation (install, modify or delete PCC rules) on the 3G default bearer for applicable parts of the PCC rules only. Examples of non-applicable parts are QCI/ARP (/MBR/GBR) information that needs to be overwritten by the value for the 3G default bearer or omitted. New and/or modified PCC rules may be marked as "temporary moved" so as to remember rules that are associated with dedicated bearers.

When moving from 3G to 4G, or in general from a RAT that does not support NIDB and/or secondary PDP context to a RAT supporting NIDB and/or secondary PDP context, for the specified APN, then the PDN GW 20 may establish the dedicated bearers that are needed in 4G by moving PCC rules marked as "temporary moved" from the 3G default bearer and install the full set of PCC rules on dedicated bearers as indicated by the QCI/ARP associated with the PCC rules. Subsequently, it may inform the PCRF 60 of the outcome for bearers that fail to be (re-)established.

Figure 5:
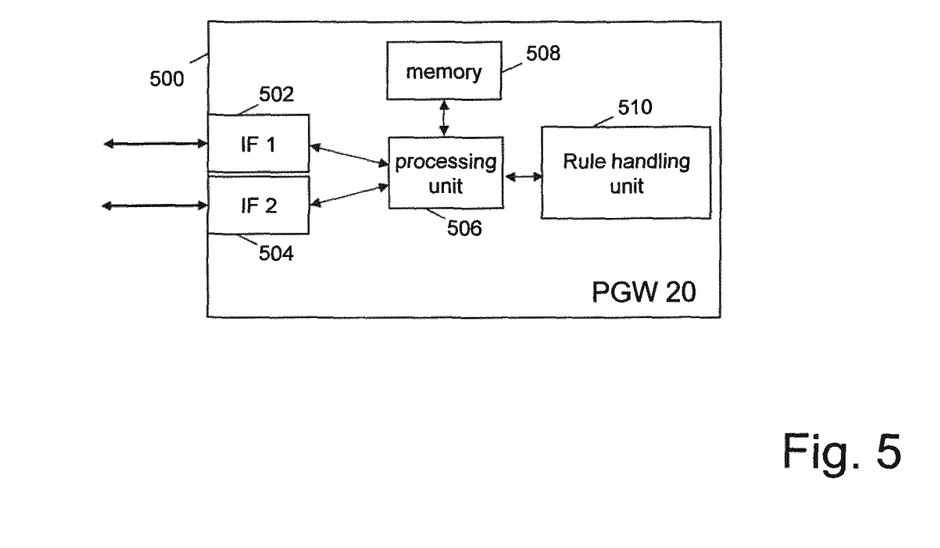
FIG. 5 shows an embodiment of a network node in the exemplary form of a PDN GW.

The PDN GW 20 mentioned above may generally be considered a gateway node which is capable of handling PCC rules. An example is depicted in FIG. 5, showing a PGW 500 which comprises a first interface 502 for communication with a mobile terminal 10, for example via bearers as shown in FIG. 1 (see also FIGS. 6 and 7 below), and a second interface 504 for communication with a policy controller, for example a Gx interface for communication with a PCRF 60 as shown in FIG. 3 (see also FIG. 2). Particularly, via the second interface 504, the PGW 500 may receive PCC rules from the policy controller which are to be applied in communication with a mobile terminal 10 via the first interface 502.

PGW 500 further comprises a processing unit 506 (e.g., a multi-purpose processor or a special purpose processor) handling, inter alia, communication via the first and second interfaces 502, 504. Coupled to processing unit 506 is a memory, which may comprise any volatile and/or non-volatile storage media like a semiconductor memory, a hard disk or the like, and which may be used to store PCC rules as received via second interface 504 from the policy controller.

The memory 508 may also be used to store program code that causes the processing unit 506 to perform the methods and method aspects presented herein when executed by the processing unit 506. Alternatively, such program code may be stored in a separate memory not shown in FIG. 5.

For rule handling, PGW 500 further comprises a rule handling unit 510, which may be incorporated in processing unit 506 or may be a different unit, or may also be embodied by software which is executed by processing unit 506. Rule handling unit 510 may be foreseen to perform the above-mentioned methods of temporarily suspending application of rules received from the policy controller, marking of these rules and re-establishing application of the rules under the circumstances as described above.

In the following, further embodiments of the present disclosure will be described with reference to FIGS. 6 to 9. The following embodiments may be based one or more of the procedures illustrated in FIGS. 2, 3 and 4. Moreover, aspects of the following embodiments, in particular one or more of the steps illustrated in FIGS. 8 and 9, may be performed or triggered by the PGW 20 as shown in FIG. 5.

Figure 6:
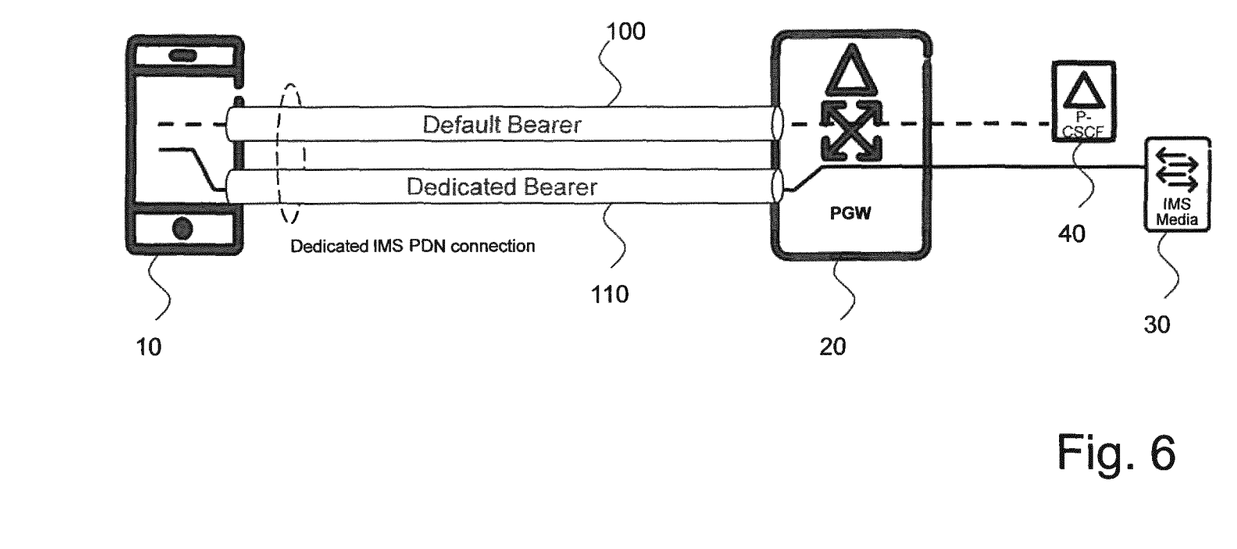
FIG. 6 depicts a first bearer scenario in accordance with an embodiment of the present disclosure.
Figure 7:
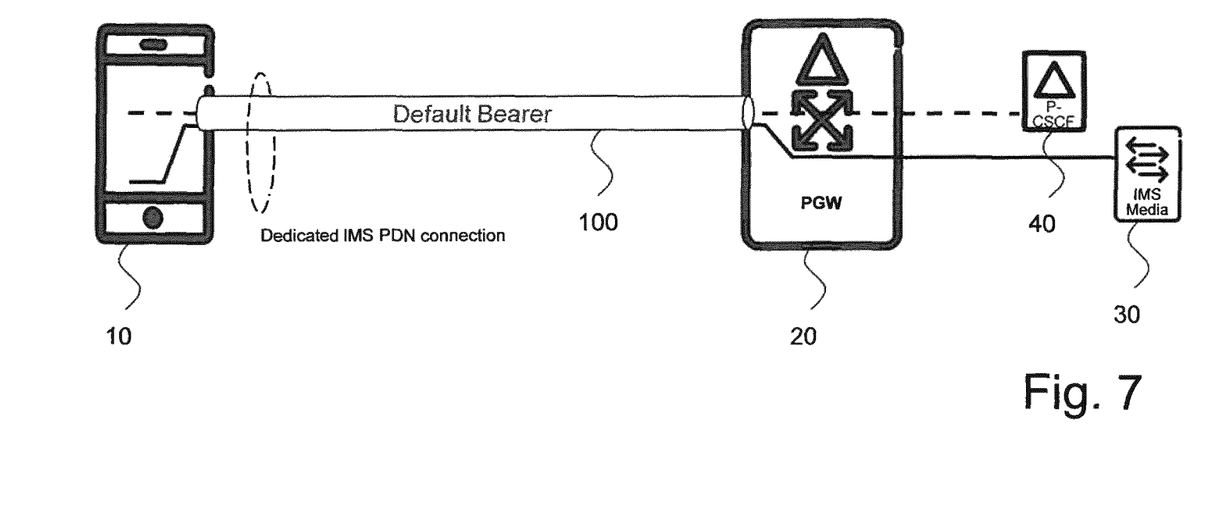
FIG. 7 depicts a second bearer scenario in accordance with an embodiment of the present disclosure.

FIGS. 6 and 7 will now be described in more detail with reference to enabling session or service continuity for a mobile terminal 10 moving between different access point types on the one hand (see also FIG. 8) and, on the other hand, with respect the establishment of the dedicated bearer for the mobile terminal 10 upon moving from one access point type to another access point type (see also FIG. 9).

FIG. 6 illustrates a bearer scenario similar to FIG. 1 in which it is assumed that a mobile terminal 10 is attached to a communication network (comprising a PGW 20, a network endpoint of an IMS 30 and a P-CSCF 40) via an access point of a first type supporting a default bearer 100 and one or more dedicated bearers 110. The default bearer 100 and the one or more dedicated bearers 110 may be bearers of a 4G network, such as a signaling bearer and a dedicated (e.g., voice) bearer, as illustrated in FIG. 1.

In the exemplary embodiment of FIG. 6, the default bearer 100 is a signaling bearer for the exchange of signaling between the mobile terminal 10 and the P-CSCF 40 via the PGW 20. The dedicated bearer 110, on the other hand, is used for the transmission of media data (e.g., voice and/or video data) between the mobile terminal 10 and the IMS 30 via the PGW 20. As generally known in the art, one or more TFTs may be installed on the mobile terminal 10 and the PGW 20 for traffic flow separation (see, e.g., FIG. 1).

FIG. 7 illustrates a scenario in which the mobile terminal 10 is attached to the network via an access point of a second type that supports a default bearer 100 but does not support dedicated bearers. Such an access point may, for example, belong to a 3G access network as discussed above. In the attachment scenario shown in FIG. 7, both the signaling and media data are transported via the default bearer 100. It will be appreciated that the configuration and setup of the default bearer 100 for the attachment scenario of FIG. 7 may be different from the configuration and setup of the default bearer 100 in the attachment scenario of FIG. 6, and also establishment of the respective default bearer 100 may differ in each case.

In the following, exemplary mobility scenarios for the mobile terminal 100 in relation to the attachment scenarios of FIGS. 6 and 7 will be described with reference to FIGS. 8 and 9. Specifically, FIGS. 8 and 9 illustrate method embodiments that may in certain variants be performed or triggered by the PGW 20 or any other network component (see also FIGS. 2 to 5).

Figure 8:
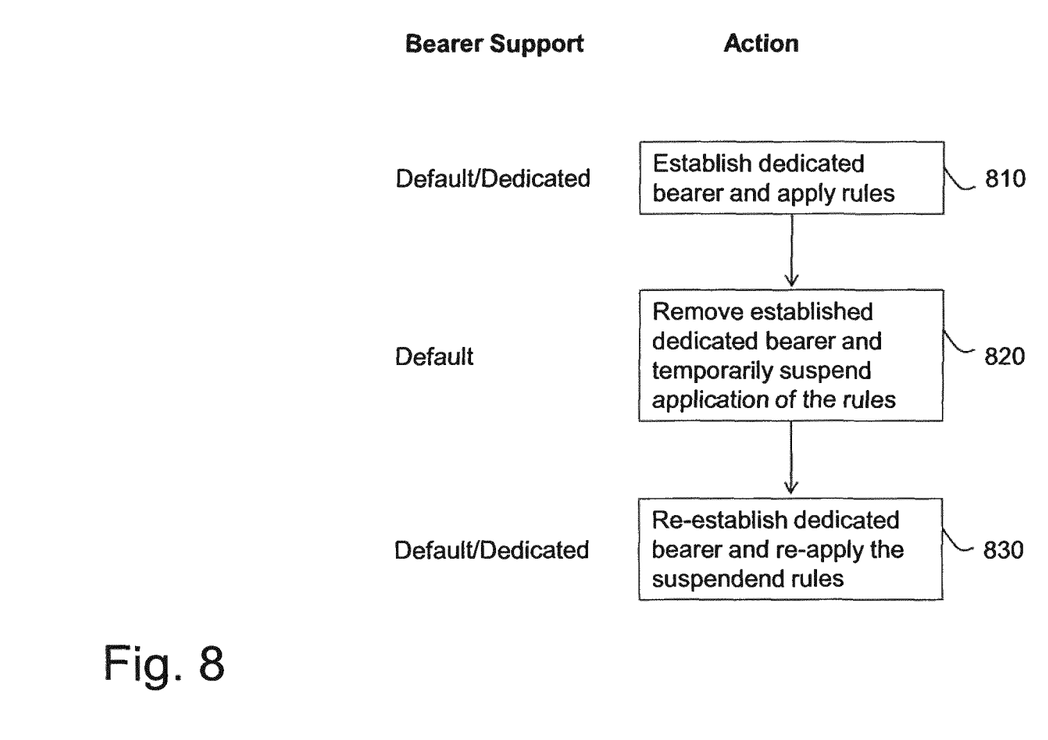
FIG. 8 illustrates a first method embodiment.

FIG. 8 illustrates a scenario in which the mobile terminal 10 moves from an access point of a first type supporting default and dedicated bearers (as illustrated in FIG. 6) to an access point of a second type supporting default and not supporting dedicated bearers (as illustrated in FIG. 7) and back again. The procedure illustrated in FIG. 8 enables session or service continuity for the mobile terminal 10 in relation to an IMS session or service between a first IMS endpoint in the mobile terminal 10 (such as the IMS application 50 illustrated in FIG. 2) and a second IMS endpoint in the network.

Initially, it will be assumed that the mobile terminal 10 is attached to an access point of the first type supporting default and dedicated bearers as illustrated in FIG. 6. As such, the one or more dedicated bearers 110 (as well as the default bearer 100) will be established and policy and charging rules will be installed and applied to the one or more dedicated bearers 110 as generally known in the art (see step 810 and, e.g., FIGS. 2, 3 and 4).

When the mobile terminal 10 then moves to an access point of a second type supporting default and not supporting dedicated bearers as illustrated in FIG. 7, the one or more dedicated bearers 110 established in step 810 will need to be removed (see FIG. 7). At the same time, application of the rules to the dedicated bearer will temporarily be suspended in step 820. It will be appreciated that the rules that have been temporarily suspended from being applied to the one or more dedicated bearers 110 may at least partly be applied to the default bearer 110 of the access point of the second type as generally described above. As an example, a non-applicable part of the rules may be overwritten with a value applicable to the default bearer 100 of the access point of the second type. Alternatively, a non-applicable part of the rules may be omitted from being applied to the default bearer 100 of the access point of the second type. An applicable part of the rules may, however, be applied to the default bearer 100 of the access point of the second type. This applicable part and, optionally, the non-applicable part of the rules may be marked or remembered (e.g., temporarily be stored).

When the mobile terminal 10 moves again from the access point of the second type (see FIG. 7) to an access point of the first type (see FIG. 6), the one or more dedicated bearers 110 will be re-established and the suspended rules will be re-applied as illustrated in step 830. Re-application of the suspended rules can be based on the rules that have been marked and/or remembered upon removal of the dedicated bearer in step 820.

During the whole procedure illustrated in FIG. 8, an established service and/or session will continue. As such, service and session continuity can be guaranteed.

Figure 9:
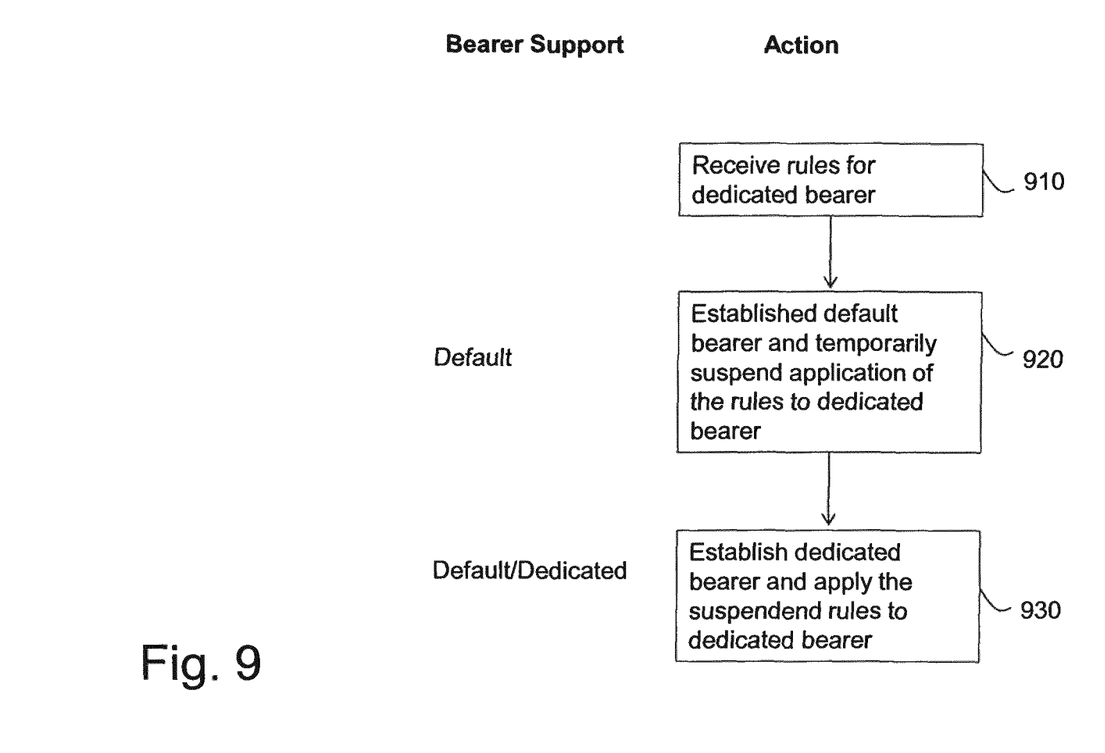
FIG. 9 illustrates a second method embodiment.

FIG. 9 illustrates an embodiment of establishing one or more dedicated bearers 110 for a mobile terminal 10 moving to an access point of a first type supporting default and dedicated bearers (see FIG. 6) from access point of a second type supporting default and not supporting dedicated bearers (see FIG. 7). The method steps illustrated in FIG. 9 may be performed or triggered by any network component, such as the PGW 20 in FIGS. 6 and 7.

In an initial step 910, policy and charging rules for application to at least a dedicated bearer 110 are received. The rules may be received from a policy controller such as the PCRF 60 discussed above with reference to FIGS. 2 and 3.

In a further step 920, a default bearer 100 is established via an access point of the second type that only supports default bearers (see FIG. 7). Since no dedicated bearer can be established, application of the rules to the dedicated bearer is temporarily suspended. It will be appreciated that the rules for the dedicated bearer (see step 910) can be received at an arbitrary point in time, and in particular prior to or after establishment of the default bearer as shown in FIG. 7.

Upon a move of the mobile terminal 10 from the access point of the second type (see FIG. 7) to an access point of the first type supporting both default and dedicated bearers (see FIG. 6), one or more dedicated bearers 110 are established in step 930. Moreover, the rules received in step 910 are applied to the established one or more dedicated bearers 110. The rules received in step 910 may specifically be marked as being intended for application to a dedicated bearer 110. Nonetheless, the rules may at least partly be applied to the default bearer 100 of the access point of the second type that is established in step 920. As discussed above with reference to FIG. 8 a non-applicable part of the rules may be overwritten with a value applicable to the default bearer 100 of the access point of the second type, or may be omitted from being applied to the default bearer 100 of the access point of the second type.

In the procedure illustrated in FIG. 7, rules for dedicated bearers can be installed already prior to establishing the dedicated bearers and in particular while the mobile terminal is still attached to an access point not supporting dedicated bearers.

Clearly, several modifications will be apparent to and can be readily made by the skilled in the art without departing from the scope of the present disclosure.

For example, while several embodiments have been described in the context of VoLTE, IMS APN and 4G/3G accesses, the present disclosure is also applicable to other APNs (access points) and scenarios where devices move between access types with different capabilities regarding supported bearers (e.g., also applicable for the case the mobile terminal, such as UE, switches between a EPC-integrated WiFi access with only a single bearer supported and cellular access with support of multiple bearers).

Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by those skilled in the art.

The invention claimed is:

1. A method of enabling session or service continuity for a mobile terminal moving between an access point of a first type supporting default and dedicated bearers to an access point of a second type supporting default and not supporting dedicated bearers, wherein policy and charging rules are provided for application to at least a dedicated bearer, the method comprising:

upon a move from the access point of the first type to the access point of the second type, removing an established dedicated bearer and temporarily suspending application of the policy and charging rules to the dedicated bearer, wherein a session or service endpoint is kept agnostic of the removal of the dedicated bearer and a service supported by the dedicated bearer can be continued by a default bearer;

upon a move from the access point of the second type to the access point of the first type, reestablishing the dedicated bearer and reapplying the policy and charging rules to the reestablished dedicated bearer.

2. The method of claim 1, wherein the endpoint is an Internet Protocol Multimedia Subsystem (IMS) or IMS application.

3. The method of claim 1, wherein the policy and charging rules are applied at least partly to the default bearer of the access point of the second type.

4. The method of claim 3, wherein a non-applicable part of the policy and charging rules is overwritten with a value applicable to the default bearer of the access point of the second type.

5. The method of claim 4, wherein the non-applicable part is related to one or more of:
   a Guaranteed Bit Rate (GBR);
   a Minimum Bit Rate (MBR);
   a Quality of Service Class Identifier (QCI);
   an Allocation and Retention Priority (ARP).

6. The method of claim 3, wherein a non-applicable part of the policy and charging rules is omitted from being applied to the default bearer of the access point of the second type.

7. The method of claim 1, wherein a communication session is maintained during a change of the mobile terminal from the access point of the first type to the access point of the second type.

8. The method of claim 1, wherein the policy and charging rules are applied upon a change of the mobile terminal from the access point of the second type to the access point of the first type.

9. The method of claim 1, wherein the policy and charging rules have been set for application by a network node and wherein the mobile terminal is attached to the network node.

10. The method of claim 9, wherein the network node is a gateway node.

11. The method of claim 1, wherein the access point of the first type is an access point which supports at least one of network initiated dedicated bearers and secondary PDP contexts.

12. The method of claim 1, wherein the access point of the second type is an access point which does not support at least one of network initiated dedicated bearers and secondary PDP contexts.

13. The method of claim 1, further comprising receiving the policy and charging rules from a policy controller.

14. A method of establishing a dedicated bearer for a mobile terminal moving to an access point of a first type supporting default and dedicated bearers from an access point of a second type supporting default and not supporting dedicated bearers, the method comprising:
   receiving policy and charging rules for application to at least the dedicated bearer;
   suspending the policy and charging rules temporarily responsive to the establishment of the default bearer such that a session or service endpoint is kept agnostic of the lack of the dedicated bearer and a service can be initiated on the default bearer;
   upon a move from the access point of the second type to the access point of the first type, establishing the dedicated bearer and applying the policy and charging rules to the established dedicated bearer.

15. A network node for enabling session or service continuity for a mobile terminal moving between an access point of a first type supporting default and dedicated bearers to an access point of a second type supporting default and not supporting dedicated bearers, wherein policy and charging rules are provided for application to at least a dedicated bearer, the network node comprising:
   processing circuitry;
   memory containing instructions executable by the processing circuitry whereby the arrangement is operative to:
      upon a move from the access point of the first type to the access point of the second type, trigger removal of an established dedicated bearer and temporary suspension of application of the policy and charging rules to the dedicated bearer, wherein a session or service endpoint is kept agnostic of the removal of the dedicated bearer and a service supported by the dedicated bearer can be continued by a default bearer;
      upon a move from the access point of the second type to the access point of the first type, trigger reestablishment of the dedicated bearer and reapplication of the policy and charging rules to the reestablished dedicated bearer.

16. The network node of claim 15, wherein the network node is a packet gateway.

17. A network node for establishing a dedicated bearer for a mobile terminal moving to an access point of a first type supporting default and dedicated bearers from an access point of a second type supporting default and not supporting dedicated bearers, the network node comprising:
   processing circuitry;
   memory containing instructions executable by the processing circuitry whereby the network node is operative to:
      receive policy and charging rules for application to at least the dedicated bearer;
      suspend the policy and charging rules temporarily responsive to the establishment of the default bearer such that a session or service endpoint is kept agnostic of the lack of the dedicated bearer and a service can be initiated on the default bearer;
      upon a move from the access point of the second type to the access point of the first type, trigger establishment of the dedicated bearer and application of the policy and charging rules to the established dedicated bearer.

* * * * *